March 1, 1960

C. A. TAYLOR 2,926,898

ACCELEROMETER

Filed March 30, 1956

INVENTOR.
CHARLES TAYLOR
BY
*Ralzemond B. Parker*
ATTORNEY

March 1, 1960  C. A. TAYLOR  2,926,898
ACCELEROMETER
Filed March 30, 1956  3 Sheets-Sheet 2
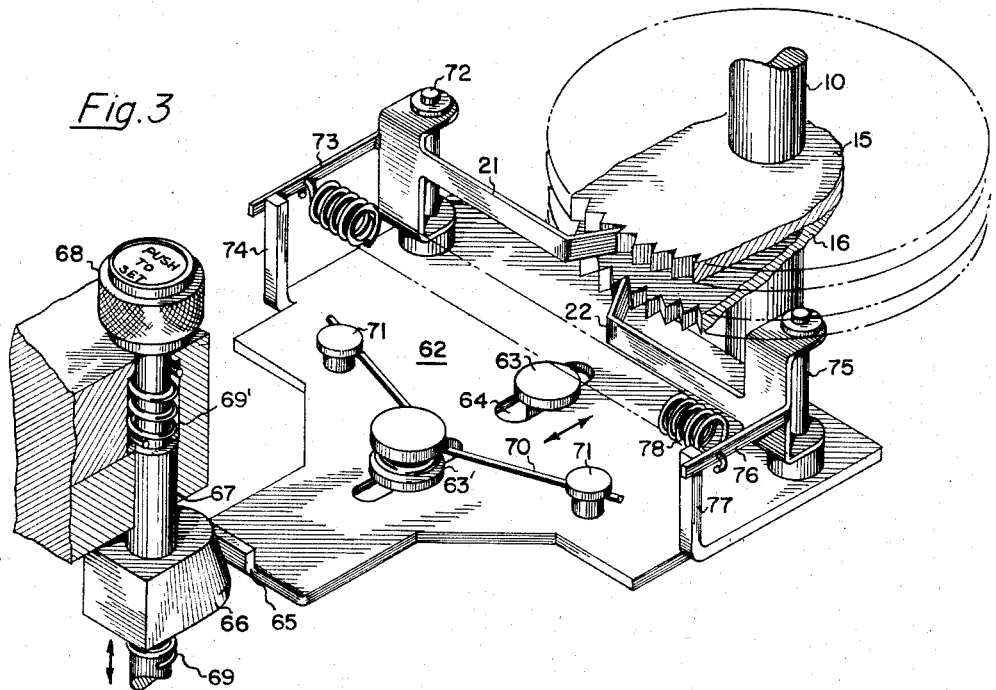
Fig. 3
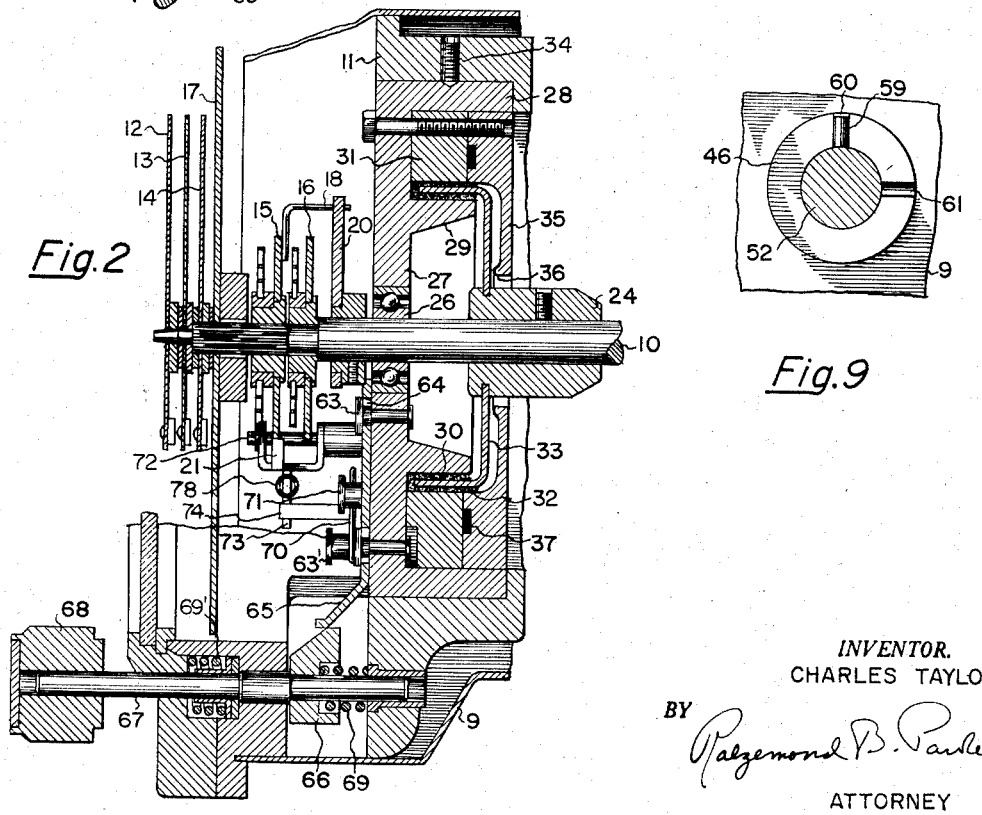
Fig. 2
Fig. 9
INVENTOR.
CHARLES TAYLOR
BY
ATTORNEY March 1, 1960  C. A. TAYLOR  2,926,898
ACCELEROMETER
Filed March 30, 1956  3 Sheets-Sheet 3

INVENTOR.
CHARLES TAYLOR
BY
Ralzemond B. Parker
ATTORNEY

United States Patent Office 2,926,898
Patented Mar. 1, 1960

2,926,898

ACCELEROMETER

Charles A. Taylor, Berwyn, Pa., assignor to Burroughs Corporation, Detroit, Mich., a corporation of Michigan Application March 30, 1956, Serial No. 575,126

3 Claims. (Cl. 264—1)

The present invention relates to indicating instruments and more particularly to accelerometers for use on aircraft or other carriers wherein information as to acceleration is an important factor.

In accelerometers as heretofore constructed it has been found that in use the required sensitiveness and response to deviations of an airplane are hampered by inaccuracies due to unforeseen spurious motions. In an instrument of the critical nature here involved these inaccuracies present problems not heretofore solved.

An object of the invention is to provide an accelerometer wherein improved means is provided to indicate maximum positive and negative acceleration of a moving body.

Another object is to provide improved means for indicating the acceleration of a moving body in association with means for also indicating respectively the maximum plus or minus acceleration of the body.

Another object is to provide an indicating instrument responsive to a gravity controlled mass and wherein two unidirectional pointers are arranged to respond respectively to plus and minus acceleration as indications of maximum mass movement in association with a mechanism for locking each unidirectional pointer in such maximum indicating position.

Another object is to provide a gravity controlled mass for operating an indicating accelerometer including means for locking the mass with its controlled parts in zero positions.

Another object is to provide an accelerometer which is easily assembled and disassembled during field maintenance.

Another object is to provide an accelerometer wherein a novel damping mechanism is included as an associated part.

A further object is to provide a two position selecting means for locking and unlocking a gravity controlled mass, wherein the means can be locked in both selected positions.

Various other objects, advantages and meritorious features of the invention will become more apparent from the following specification, appended claims and accompanying drawings wherein:

Fig. 2 is a sectional view on line 2—2 of Fig. 1;

Fig. 3 is a detail perspective view of the reset mechanism;

Fig. 9 is a sectional view on line 9—9 of Fig. 1.

Figure 1:
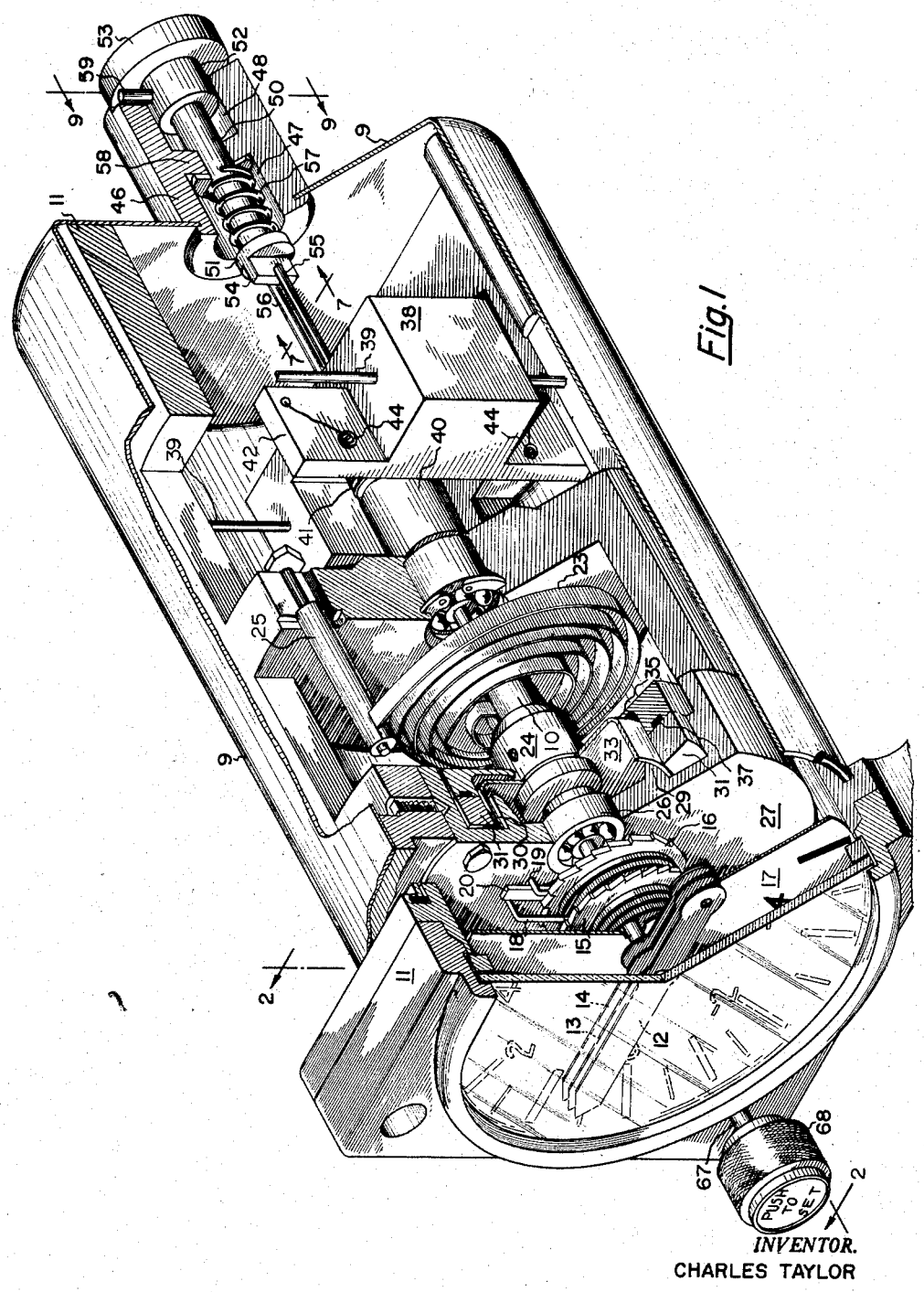
Fig. 1 is a perspective view, broken away, of an accelerometer embodying one form of the present invention.

Referring to the drawings and particularly Fig. 1, an embodiment of the invention is shown as an accelerator indicating and dial system wherein a main or indicator shaft 10 is journalled in a frame 11, and carries on one end a pointer assembly including an instantaneous indicating pointer 12 keyed to the shaft and two freely mounted maximum indicating pointers 13 and 14 respectively coupled to two spring loaded ratched wheels 15 and 16 for joint turning movement through the medium of separate bushings concentrically mounted upon the shaft 10. The frame 11 is housed in a casing 9 for dust proof protection. The three pointers are arranged to sweep the face of a units of gravity dial 17 so that the pointer 12 rotating with the shaft 10 provides instantaneous readings in units of gravity in either plus or minus directions during tests while the pointers 13 and 14 provide stable indications respectively of the plus maximum and negative maximum accelerations during any maneuver of an aircraft in which the instrument is mounted. Also it will be understood that the two ratchet wheels 15 and 16 rotate in opposite directions in accordance with motion transmitted by an arm 20 fixed to the shaft 10 as shown in Fig. 2 and projecting radially therefrom to a position between pins 18 and 19, carried respectively by the juxtaposed faces of the wheels 15 and 16 and bent to overlap the arm. Two pawls 21 and 22 (see Fig. 3) respectively engage the ratchet wheels 15 and 16, as a means for holding each wheel at its maximum plus or minus rotation point for a reading of the associated pointer after some time interval.

For creating a torque upon the shaft 10 in opposition to the torque produced by the acceleration of a gravity responsive mass, a helically coiled torsion spring 23 is provided having an inner end keyed to the indicator shaft 10 rearwardly of hub 24, and has its outer end held by a stud 25 fastened to the frame 11. The stud 25 permits adjustment of the spring rate, affects linearity and spring positioning. This spring 23 provides a restraining torque to the acceleration applied to the mass. The design of the spring 23 is chosen to allow it to remain linear throughout the deflection range.

In order to minimize the effect of developed vibrations and secure the required frequency response of the instrument, it is preferable to provide a damping mechanism, which in this instance, is located adjacent to the ratchet mechanism and provides a bearing 26 for an end of the shaft 10. As shown in Figs. 1 and 2, this damping mechanism comprises a circular plate 27 having an outer annular flange 28 and an inner concentric flange 29, the latter forming one side of a circumferential groove 30 of which the opposite side is formed by a ring 31. This groove 30 provides a receptacle for a damping fluid 32 of relatively heavy viscosity in which the rim of a cup 33 rides as an attached part of the hub 24. The plate 27 journals the bearing 26 and is fixed to the frame 11 by a set screw 34.

For preventing escape of the fluid 32 the cup 33 is housed in an annular cover 35, bolted or otherwise made fast to the plate 27 and the ring 31, and formed with a laterally disposed circumferential lip 36 which is juxtaposed to the rear face of the cup 33 but out of contact therewith. Thus any displaced fluid 32 is trapped and cannot escape. Also a gasket 37 is interposed between the cover 35 and the ring 31 to prevent leakage along the joint. It should be observed that the groove 30 could be machined into a thickened face of the plate 27 to serve the same purpose but for practical assembly reasons the supplemental ring construction is preferred. Also it will be noted that this damping mechanism is a complete unit mounted in and carried by the frame 11, for ease of assembly, repair or replacement. The damping forces are a function of the velocity and area of the damping cup, viscosity of the damping fluid, and the clearance between the moving cup and stationary members of the unit.

Figure 6:
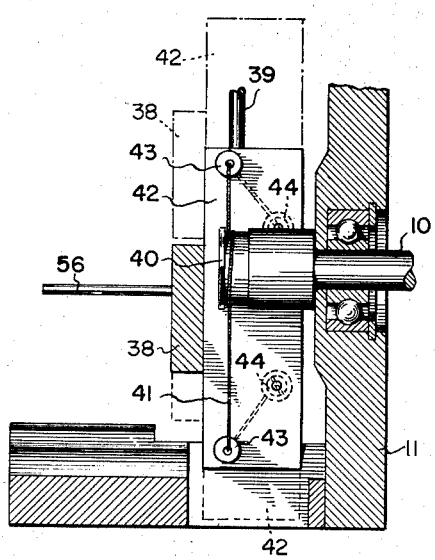
Fig. 6 is a sectional view on line 6—6 of Fig. 4.

An important feature of the invention is the provision for translating the forces acting upon the airplane, under accelerating conditions, into measurements which are indicated by the pointers 13 and 14. For this purpose a movably mounted gravity responsive mass 38 is provided adjacent the rear end of the unit, and arranged for sliding movement upon two guide rods 39 which have ends respectively attached to the frame 11 and provide movement of the mass perpendicular or crosswise to the axis of shaft 10. Preferably the mass 38 is a U-shaped block straddling a sheave 40 keyed to the rear end of shaft 10 for pointer control purposes. A cord 41, having a convolution about the sheave 40, transmits movement of the mass to the shaft 10. The cord 41 is maintained under tension by having its ends fastened respectively to opposite ends of a supplemental weight in the form of a plate 42 forming an integral part of the mass 38 as shown or fixed to the inner face of one of the legs thereof. Preferably the ends of the cord 41 respectively pass through holes 43 provided in the plate 42 and are anchored in stretched condition by attaching screws 44 or the like on the opposite side of the plate. The mass 38 and plate 42 jointly move on the rods 39—39 and this movement is converted into a rotary motion of the shaft 10 by means of the cord and sheave wheel. The extent of movement of the mass and associated parts is shown in dotted outline in Figure 6. Portions of the supporting frame 11 may be cut away to provide clearance for this movement.

The weight of the plate 42 added to that of the mass 38 makes it possible to locate the straight line portions of the cord 41 in alignment with the center of gravity of the composite mass 38. Since the length of the cord passes through the center of gravity of the mass, the inertia force acting on the mass and the equilibrating force in the cord are linear and no couples between these forces can arise to cause binding between the mass and its guide rods. Hysteresis due to static friction between the mass and the guide rods is thus mitigated.

Figure 7:
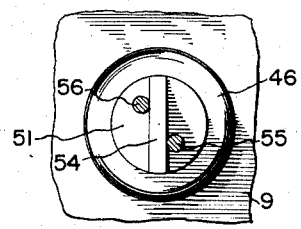
Fig. 7 is a detail view in elevation of the mass locking mechanism taken along line 7—7 of Fig. 1 and showing the mechanism in unlocked position.
Figure 4:
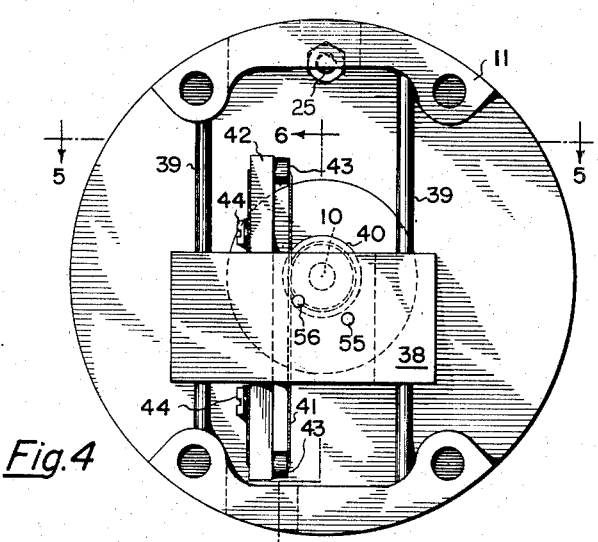
Fig. 4 is an end elevation of a component of the accelerometer showing a slidable mass responsive to acceleration.
Figure 8:
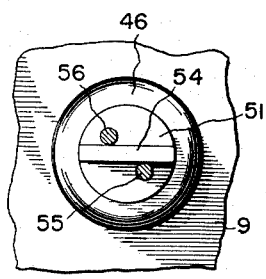
Fig. 8 is a view like Fig. 7 showing the parts in locked position.
Figure 5:
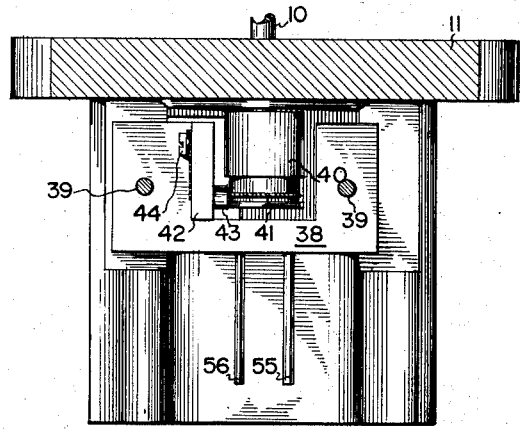
Fig. 5 is a sectional view on line 5—5 of Fig. 4.

In order to protect the accelerometer against damage during shipment, storage and otherwise, a locking device, shown in Figs. 1, 7 and 8, is provided, comprising a housing 46 attached to the rear end wall of the casing 9 and having two aligned spaced apart chambers 47 and 48, opening out at opposite ends of the housing 46, to respectively receive parts of the lock device. This device comprises a turnable, endwise slidable spring loaded plunger 50 journalled in the housing 46 and having a lock member 51 attached at one end in juxtaposed relation to the mass 38, and a head 52 attached to the other end, such head 52 being part of a pull-turn knob 53 which is conveniently located for manual operation.

The lock member 51 is formed with a projecting transverse lug 54, on its face opposite to the mass, to be positioned between two laterally spaced and axially offset locking pins 55 and 56, which project from the rear side of the mass 38. The lug 54 is in the form of a strip having a thickness less than the spacing of the pins so that in one position of the lug (Fig. 7) the pins are free to rise or fall and in a second position (Fig. 8) to lie in the path of movement of the pins and prevent movement of the mass. As a part of the locking mechanism a compression spring 57 encircles the part of the plunger 50 in the chmaber 47 and is compressed between the lock member 51 and an internal rib 58 of the housing 46.

For locking the lug 54 in either selected position, the head 52 has a radially projecting detent pin 59 arranged to seat in either of two limit slots 60 and 61, best shown in Fig. 9, which are cut in the outer end of the housing according to the locking or unlocked relation of the pins. In both positions the lug 54 is releasably locked against turning movement from its selected position. This selection positioning is accomplished by pulling the knob 53 outwardly to bring the detent pin 59 out of one slot and then turning the knob, through the required angle, to enter the second slot at which time the knob is released to the action of the biasing spring 57. For example, to lock the mass the knob is turned to bring the pin 59 into register with the slot which corresponds to the transverse position of the lug 54, whereupon release of the knob brings the lug into the path of the two mass pins 55 and 56 to lock the mass against sliding movement. The lug 54 is restored to unlocked position by again retracting the plunger 50, and turning the knob to bring the detent into register with the slot denoting the unlocked position whereupon release of the plunger locates the lug 54 parallel to the travel of the pins 55 and 56. In both positions the lug 54 is locked against movement.

A feature of the apparatus is the provision for resetting the auxiliary pointers 13 and 14, which indicate the maximum and minimum acceleration during any given maneuver, after such maneuver is completed, which feature is described and claimed in the copending application for patent of Charles A. Taylor entitled "Reset Mechanism for Accelerometers," Serial No. 575,125, filed March 30, 1956, now Patent No. 2,878,775, dated March 24, 1959, and assigned to the same assignee as the present application. For this resetting purpose, after an accelerating movement, the mechanism of Fig. 3 is provided wherein the pawls 21 and 22 are supported from the same side face of a position control plate 62 which is slidably supported by studs 63—63', the latter being double headed, which project respectively from an attached part of the frame 11 and ride in their respective slots 64 in the control plate 62. A tongue or cam arm 65, as a part of the plate 62, projects at an incline into the path of movement of a tapered cone-like cam 66 which functions when moved to "set position" to slidably engage the inclined tongue 65 and shift and hold the plate 62 in pawl engaging position. The cam 66 is fixed to a rod 67 suitably supported for axial movement and terminating in an external reset knob 68. A spring 69 is coiled about the rod 67 and is compressed between the cam 66 and a fixed part to bias and maintain the cam 66 in plate raised position with the pawls 21 and 22 respectively riding against the ratchets of the wheels 15 and 16. By manually pushing the knob 68 against the biasing spring 69 the cam 66 is moved away from the inclined arm 65 whereby the slide plate 62 drops to "reset position" with the aid of the biasing action of a torsion spring 70. The spring 70 has a convolution wrapped around the double headed stud 63' and has its ends biased respectively against two laterally spaced upstanding lugs 71 to exert a withdrawing force upon the plate 62. The shifting of the plate 62 withdraws the pawls 21 and 22 to release the ratchet wheels 15 and 16 to the action of the respective wheel loading springs. The ratchet wheels then return the respective pointers to zero. Preferably a spring loaded seal 69' encircles the rod 67 to keep out moisture.

As shown the plus pawl 21 forms one leg of a bell crank pivoted to swing about a pin 72 which rises from the plate 62 parallel to the axis of the wheel 15, while the other leg 73 of the bell crank is arranged to abut a stop 74, here shown as a part of the plate 62. As so mounted the radial length of the pawl 21 is such as to engage the teeth of its wheel 15 at a point lying in a radial plane passing through the wheel axis.

Similarly the minus pawl 22 forms one leg of a bell crank pivoted to swing about a pin 75 which also rises from the plate 62 parallel to the axis of the wheel 16, while the other leg 76 of the bell crank is arranged to abut a stop 77, here shown as a part of the plate 62. As so mounted the radial length of the pawl 22, like that of the pawl 21, is such as to engage the teeth of its wheel 16 in the same radial plane as that described for the pawl 21. It should also be noted that the two bell cranks as mounted on the pivots 72 and 75 lie in the planes of their respective ratchet wheels 15 and 16, that is, laterally spaced apart from one another a distance corresponding to the spacing of the two wheels.

It is important to note that the two pawls 21 and 22 thus lie in a common radial plane including the shaft 10 so that the points of pawl engagement action are radial as distinguished from tangential engagement, when following the lineal restoring of the plate 62. By this construction possible disturbance of the wheel upon pawl engagement cannot take place. Thus, it is evident that the pawls each have both a swinging movement about their respective pivotal mountings and a bodily movement jointly together with the plate 62.

The two pawls 21 and 22 are biased to wheel engaging positions by a coil spring 78 stretched between the legs 73 and 76 and tensioned to hold the latter against their respective limit stops 74 and 77. Thus the stop 74 limits the turning of the pawl 21 to its wheel engaging position, and the stop 77 limits the turning of the pawl 22 to its wheel engaging position, so that no unnecessary drag is applied to the movement of the wheels.

For operation the accelerometer assembly is initially calibrated by tensioning the spiral spring 23 to locate the mass 38 in a neutral position and preferably to set the pointers in a 1-g position. When the instrument is mounted in an aircraft the mass guide rods 39 are arranged normal to the plane of the aircraft wings. Now when the plane goes into a dive the mass 38 is acted upon by positive accelerations and the cord 41 causes the sheave 40 to rotate the shaft 10 in a clockwise direction to give positive readings in units of gravity by the indicating pointer 12 and the plus pointer 13 on the dial 17. When the plane is pulled out of the dive the pointer 12 follows the counter-clockwise rotation of the shaft 10 but the pointer 13 remains in its maximum turned position because the ratchet wheel 15 is locked against return movement by its pawl 21. During the climb of the plane from the completed dive the mass 38 moves along the guide rods 39 in the opposite direction causing the shaft 10 to turn in a counter-clockwise direction whereby the indicating pointer 12 turns counter-clockwise for negative indication and the minus pointer 14 follows in the same direction to be finally latched in the position indicating the maximum negative acceleration.

At the end of the acceleration test, the instrument is reset to zero for another test by operating the reset mechanism. In so resetting the rod 67 is pushed inwardly by the knob 68 on the front of the nut to withdraw the cam 66 from its supporting position under the arm 65, thereby releasing thep late 62 to the pull of the torsion spring 70 and so withdrawing the pawls 21 and 22 from engagement with the respective ratchet wheels 15 and 16, the spring loading of which resets the pointers 13 and 14 to zero.

What is claimed is:
1. A cable drive mechanism comprising a rotatable sheave, a weighted member, means for guiding said weighted member for movement along a straight line, said weighted member shaped to straddle said rotatable sheave, and being extended in the direction corresponding to said line of movement to provide anchor points spaced apart from one another a distance substantially greater than the diameter of the sheave, a cord wrapped around said sheave and having its opposite end portions extending tangentially from the periphery of said sheave and parallel to the line of movement of said weighted member and secured at their extremities to said anchor points, the distance between said anchor points of said cord permitting limited movement of said weighted member in opposite directions, said weighted member being so constructed that the center of gravity of its mass is substantially intersected by the line formed by said opposite end portions of the cord and traverses said line during movement of the member as provided by said guide means.

2. An aircraft accelerometer including, in combination, a rotatable shaft, a weighted member responsive to positive and negative acceleration, means for guiding said weighted member for movement along a straight line, said weighted member being recessed to straddle said rotatable shaft, a cord wrapped around said rotatable shaft and having its opposite end portions forming a line extending tangetnially from the periphery of said shaft in opposite directions but parallel to the straight line movement of said weighted member with the terminal ends of said cord affixed to the member, said weighted member being so constructed that the locus of its center of gravity during movement thereof is coincident with the line formed by said tangentially disposed opposite end cord portions, and spring means connected to said shaft for creating a torque opposing the torque produced upon acceleration of the weight and acting to return the weighted member to a zero reference upon cessation of the acceleration of the member.

3. In an accelerometer having a housing, a rotatable sheave, a weighted member, means for guiding said weighted member for movement along a straight line, said weighted member shaped to straddle said rotatable sheave, and being extended in the direction corresponding to said line of movement to provide anchor points spaced apart from one another a distance substantially greater than the diameter of the sheave, a cord wrapped around said sheave and having its opposite end portions extending tangentially from the periphery of said sheave and parallel to the line of movement of said weighted member and secured at their extremities to said anchor points, the distance between said anchor points of said cord permitting limited movement of said weighted member in opposite directions, said weighted member being so constructed that the center of gravity of its mass is substantially intersected by the line formed by said opposite end portions of the cord and traverses said line during movement of the member as provided by said guide means, a locking member having an elongated lug, and a pair of laterally spaced pins affixed to said weighted member and in traddling relationship with said lug, said locking member being mounted for rotation in said housing from one position in which said lug is transverse to the line of movement of said weighted member so that said lug lies in the path of movement of said pins and thereby locks said member against movement, and rotatable to a second position in which said lug is aligned parallel to the line of movement of said weighted member and said pins to thereby permit movement of the member and pins.

References Cited in the file of this patent

UNITED STATES PATENTS

| | | |
|---|---|---|
| 436,761 | Koenig | Sept. 16, 1890 |
| 1,987,854 | Myers et al. | Feb. 14, 1933 |
| 2,358,980 | Kent | Sept. 26, 1944 |
| 2,394,974 | Bevins | Feb. 19, 1946 |
| 2,518,928 | Paine et al. | Aug. 15, 1950 |
| 2,660,421 | Sorensen | Nov. 24, 1953 |

FOREIGN PATENTS

| | | |
|---|---|---|
| 405,763 | France | Nov. 23, 1909 |